United States Patent [19]
Patterson

[11] Patent Number: 6,045,010
[45] Date of Patent: Apr. 4, 2000

[54] HAND POWERED LIQUID CHEMICAL MEASURING AND DISPENSING SYSTEM

[75] Inventor: David R. Patterson, Fort Wayne, Ind.

[73] Assignee: Murray Equipment, Inc., Fort Wayne, Ind.

[21] Appl. No.: 09/093,759

[22] Filed: Jun. 9, 1998

[51] Int. Cl.[7] .................................................. B65B 31/00
[52] U.S. Cl. ............................ 222/394; 222/65; 222/67; 222/69; 222/152; 222/438; 222/450; 141/65; 141/67
[58] Field of Search ................................... 222/65, 67, 69, 222/152, 394, 400.7, 400.8, 401, 402, 434, 438–440, 450; 141/2, 4, 5, 7, 18, 21, 25–28, 59, 65, 67, 91, 92

[56] References Cited

U.S. PATENT DOCUMENTS

| | | | |
|---|---|---|---|
| Re. 25,037 | 9/1961 | Brazier | 137/599.1 |
| 222,300 | 12/1879 | Neumann . | |
| 969,090 | 8/1910 | Culbertson et al. . | |
| 1,419,880 | 6/1922 | Mauclere . | |
| 1,925,248 | 9/1933 | Hill | 221/100 |
| 2,221,487 | 11/1940 | Moore | 221/116 |
| 2,506,240 | 5/1950 | Sekkel | 222/67 |
| 2,526,784 | 10/1950 | Walker | 210/156 |
| 2,563,930 | 8/1951 | Hamann et al. | 222/67 |
| 2,572,540 | 10/1951 | Thompson | 222/402 |
| 2,600,518 | 6/1952 | Ruth | 248/180 |
| 2,614,742 | 10/1952 | Price | 226/113 |
| 2,682,886 | 7/1954 | Paxton | 137/105 |
| 3,386,175 | 6/1968 | Stockman | 33/174 |
| 3,455,346 | 7/1969 | Stork | 141/42 |
| 3,592,385 | 7/1971 | Smith | 239/10 |
| 3,763,570 | 10/1973 | Andersen | 33/370 |
| 3,940,063 | 2/1976 | Baumgartner et al. | 239/70 |
| 3,976,087 | 8/1976 | Bolton et al. | 137/15 |
| 4,148,610 | 4/1979 | Miller, Jr. et al. | 23/230 |
| 4,161,197 | 7/1979 | Stevenson | 141/18 |
| 4,254,805 | 3/1981 | Reeder | 141/59 |
| 4,344,469 | 8/1982 | Brown | 141/90 |
| 4,530,370 | 7/1985 | Horky | 134/57 |
| 4,548,088 | 10/1985 | Hood, Jr. | 73/864 |
| 4,640,461 | 2/1987 | Williams | 239/317 |
| 4,690,179 | 9/1987 | Bleth et al. | 141/1 |
| 4,697,739 | 10/1987 | McCracken et al. | 239/127 |
| 4,698,983 | 10/1987 | Hechavarria | 62/292 |
| 4,714,088 | 12/1987 | Ivins | 137/426 |
| 4,714,196 | 12/1987 | Mceachern et al. | 239/62 |
| 4,721,245 | 1/1988 | Van Zweeden | 239/10 |
| 4,726,526 | 2/1988 | Ostergaard | 239/318 |
| 4,741,368 | 5/1988 | Crumby | 141/18 |
| 4,869,301 | 9/1989 | Ohmi et al. | 141/85 |
| 4,881,687 | 11/1989 | Ballu | 222/400.7 |
| 4,925,096 | 5/1990 | Gill | 239/10 |
| 4,945,955 | 8/1990 | Murphy | 141/65 |
| 4,976,295 | 12/1990 | Clisserath | 141/39 |
| 4,997,111 | 3/1991 | Lowers | 222/400.7 |
| 5,002,154 | 3/1991 | Chen | 184/1.5 |
| 5,199,472 | 4/1993 | Rollison | 141/65 |
| 5,322,092 | 6/1994 | Howeth et al. | 141/3 |
| 5,450,881 | 9/1995 | Patterson | 141/4 |
| 5,564,480 | 10/1996 | Chen | 141/65 |
| 5,588,252 | 12/1996 | Stapensea et al. | 222/181.2 |
| 5,632,313 | 5/1997 | Patterson | 141/18 |
| 5,758,799 | 6/1998 | Patterson | 222/1 |
| 5,875,925 | 3/1999 | Stevens | 222/67 |
| 5,911,252 | 6/1999 | Cassel | 141/27 |

*Primary Examiner*—J. Casimer Jacyna
*Attorney, Agent, or Firm*—Baker & Daniels

[57] ABSTRACT

A hand-powered apparatus and method for measuring and dispensing a predetermined volume of liquid. A predetermined volume of liquid is selected using a control knob on the apparatus and a valve is moved to a fill position. The handle on an attached hand pump is then moved alternately up and down causing fluid to be drawn into a measuring vessel. Further upward movement of the handle is prevented upon the fluid level in the vessel reaching the selected volume. Thereupon, the valve is moved to a dispense position whereby continued pumping of the handle is again possible. The handle is alternately pumped up and down causing the fluid to exit the vessel.

25 Claims, 9 Drawing Sheets

FIG_1

FIG_2

FIG. 3

FIG_13

FIG_4

FIG_6

FIG_7

FIG_8

FIG_9

FIG_10

FIG_11

FIG.12

HAND POWERED LIQUID CHEMICAL MEASURING AND DISPENSING SYSTEM

BACKGROUND OF THE INVENTION

The present invention relates to an apparatus and method for the measuring and dispensing of liquids and, more particularly, to an apparatus and method for the measuring and dispensing of liquid chemicals and agrichemicals in particular.

Liquid agrichemicals such as herbicides, fertilizers, pesticides, fungicides, and the like, are advantageous over solid agrichemicals in many applications. For example, liquid agrichemicals provide faster response, especially in dry conditions, and for pesticides provide more effective control of soil insects.

Regarding certain agrichemicals, government regulations specify that such agrichemicals must be handled with a transfer system that substantially eliminates the possibility of spillage during the transfer of the agrichemical from the supply tank to the holding tank of a sprayer system.

Most modern agrichemicals are sold in a concentrated form which makes them unsuitable for direct application on the crop or field. Consequently, the concentrated agrichemical must be first diluted before application. In order to achieve a proper dilution ratio of the concentrated agrichemical to a diluent, the diluent being generally water, the concentrated agrichemical must be measured before mixing. Depending on various factors such as total end volume of mixture desired which, may be based on application or flow rate and the total acreage to be covered, as well as mixture strengths for various field conditions, etc. the proper mixture ratio is determined. The agrichemical must be accurately measured in order to achieve the proper mixture ratio in order for the agrichemical to properly perform.

Such concentrated agrichemicals generally pose a health hazard upon exposure, and thus, great care should be taken to avoid unnecessary contact therewith. The process of measuring and mixing the agrichemicals can pose a challenge to avoid unnecessary exposure.

Heretofore, various systems for measuring and diluting agrichemicals have generally included a conventional pump disposed in-line with the agrichemical for pumping the agrichemical to a mixing tank or otherwise. Usually a separate in-line pump is also used for pumping the water (diluent) into the mixing tank. Complicated valving is then utilized to control the flow. Unfortunately, such in-line agrichemical pumps tend to corrode very quickly due to the corrosive nature of agrichemicals.

Figure 3:
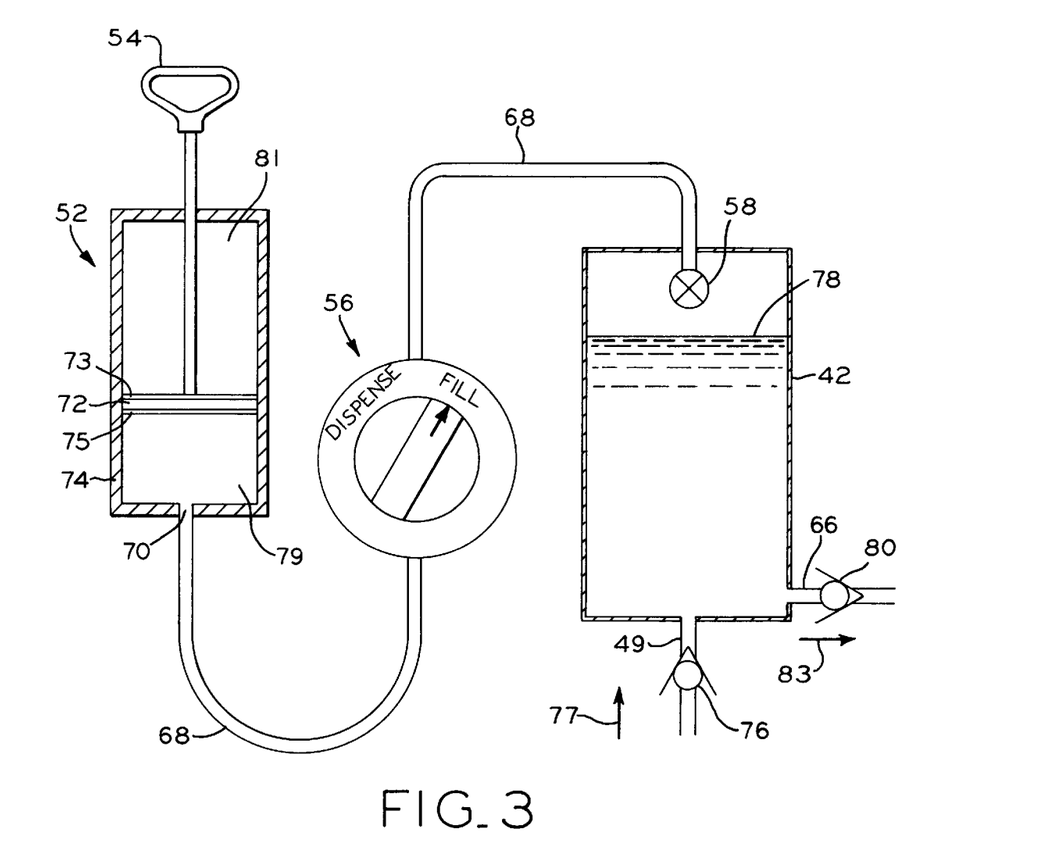
FIG. 3 is a diagrammatic view illustrating the principle of operation of the present invention.
Figure 4:
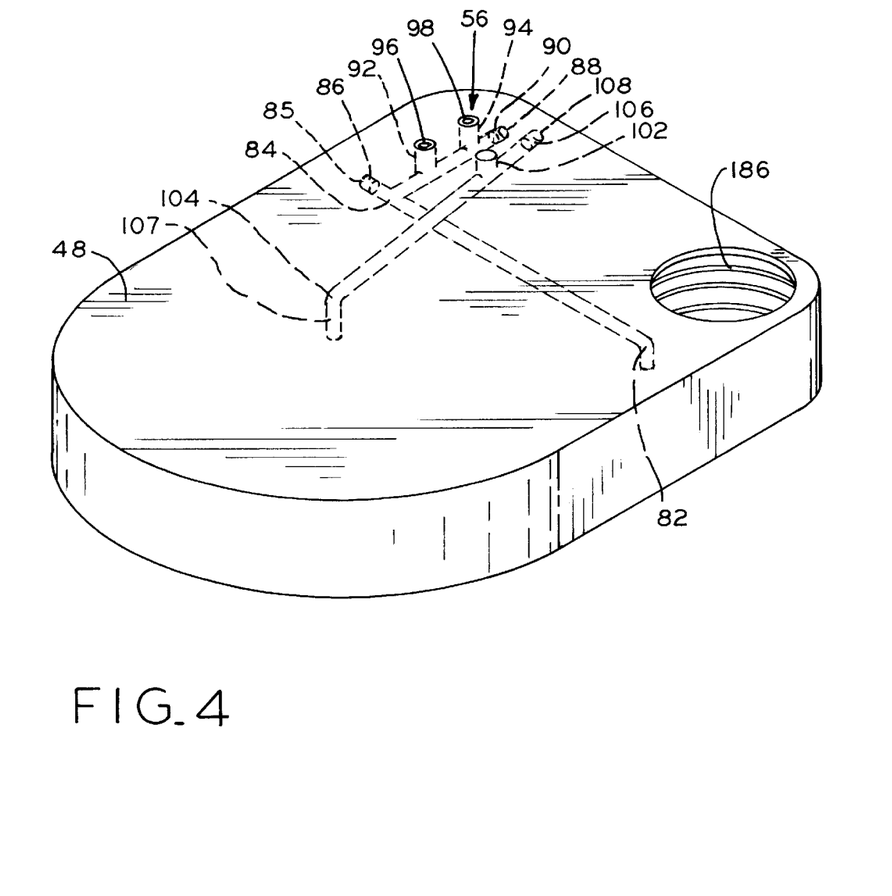
FIG. 4 is a perspective view of the top plate of the present invention.

U.S. Pat. No. 5,199,472 (Rollison) discloses a chemical transfer system which does not utilize an in-line pump for transferring the agrichemical from a storage tank to a mixing tank. A metering container assembly receives liquid agrichemical from a storage tank and transfers a desired amount of liquid agrichemical to a mixing tank or the like, without the use of an in-line pump. Referring to FIGS. 3 and 4, a single head air compressor has an inlet and an outlet which may be alternately disposed in fluid communication with the interior of the container or the ambient environment. Utilizing a first three-way valve connected to the inlet of the compressor, and a second three-way valve connected to the outlet of the compressor, the interior of the container may be connected to either the inlet or the outlet of the single head air compressor. When the inlet line of the single head air compressor is connected to the interior of the tank, a suction pressure is created within the interior of the tank which draws liquid agrichemical from a storage tank into the metering container assembly. Contrarily, when the outlet to the air compressor is connected to the interior of the metering container assembly, the liquid agrichemical is expelled from the metering container assembly to a mixing tank or the like. During a filling operation, a user visually observes the level of the liquid agrichemical within the metering container assembly and actuates the valve accordingly when the liquid agrichemical reaches a desired level. In the event a user inadvertently fails to actuate the valves and thereby cease application of suction pressure to the interior of the container, a float assembly disposed at the top of the interior of the container closes the line extending from the exterior of the tank to the inlet of the compressor. In the absence of such a float assembly, the liquid agrichemical would reach the top of the interior of the tank and may be drawn out through the tank line extending to the compressor because of the suction created within the tank line.

For proper operation of the metering container assembly, Rollison discloses a leveling device which is utilized for positioning the metering container assembly in a true vertical position. Such leveling is necessary to provide a proper visual indication to a user of the amount of fluid contained within the metering container assembly by viewing a sight gage, and also to ensure proper operation of an overflow valve. To effect leveling of the metering container assembly, a handle of a leveling means is rotated and a ball float of an indicator is aligned with cross hairs.

Another kind of measuring and dispensing method and apparatus includes a method and apparatus for drawing and measuring an amount of liquid agrichemical and dispensing the measured amount of agrichemical for mixture with water and eventual application onto a field, such as shown in U.S. Pat. No. 5,450,88, assigned to the assignee of the present application, which is hereby incorporated by reference. U.S. Pat. No. 5,450,881 discloses the agrichemical being drawn into a measuring vessel by suction pressure created in one embodiment by an air compressor and valving system, and in another embodiment by a valve pump in conjunction with a three-way valve. The agrichemical is then dispensed from the measuring vessel either by positive pressure created by the same air compressor/valving system, or by suction pressure created by the valve pump/three-way valve. The valve-pump provides both a mixing chamber for the agrichemical and water prior to tank storage for eventual application and controllable suction pressure for drawing the agrichemical out of the measuring vessel for mixing. The valve-pump is also self-cleaning thereby reducing the possibility of cross-contamination.

An object of the present invention is to provide an economical hand-powered agrichemical measuring and mixing system which overcomes the problems of the prior art by having a closed measuring and diluting system, and which does not require venting of the measuring system upon drawing a desired volume therein.

It is another object of the present invention to eliminate the conventional in-line pump.

SUMMARY OF THE INVENTION

The present invention provides a hand-powered apparatus for drawing a desired measurement volume of concentrated liquid into a measuring vessel and dispensing the measured volume therefrom and a method for using same. A predetermined volume of liquid is selected using a control knob, and by selectively engaging a valve assembly and manually operating an attached pump, the pre-determined volume can be drawn into and dispensed from the vessel.

In one form, the present invention comprises a method of measuring a desired volume of liquid chemical from a chemical storage tank and dispensing the measured volume therefrom for mixing with a diluent. The method comprises the steps of providing a measuring vessel of known volume, the measuring vessel having a fluid inlet in fluid communication with the storage tank and a fluid outlet. A manually operated pump is used to communicate suction pressure from the pump outlet to the interior of the measuring vessel which causes a desired volume of less than or equal to the predetermined volume of the measuring vessel of the chemical within the storage tank to be drawn therefrom and into the measuring vessel through the inlet. The pump is then used to communicate positive pressure from the pump outlet to the interior of the measuring vessel to dispense the measured volume of chemical from the measuring vessel through the outlet.

In another form, the present invention comprises a method of using a hand pump to draw a desired amount of liquid into a vessel and then dispensing the liquid therefrom. The method comprises the steps of first connecting a fluid inlet conduit to a supply of liquid chemical, the inlet conduit also connected to a measuring vessel having a fluid outlet conduit connected thereto. The hand pump is connected to the vessel and is operated through repeated strokes to draw a vacuum on the vessel which thereby draws liquid from the supply through the inlet conduit and into the vessel. The hand pump is then operated through repeated strokes to pressurize the vessel thereby causing the liquid therein to be forced outward through the outlet conduit.

In a preferred form, the above described method further includes presetting a desired volume of liquid to be drawn into the vessel and automatically stopping the flow of liquid into the vessel by preventing vacuum pressure to be communicated to the vessel when the desired volume of liquid has been drawn in. The step of automatically stopping the flow of liquid is accomplished by presetting the vertical position of a float activated shut-off valve in the vessel. The shut-off valve is connected to the hand pump.

One advantage of the above described method is its simplicity. By merely operating a volume control, a selectable valve and a manually operated pump, a precise volume of liquid can be drawn into and then dispensed from a measuring vessel. Furthermore, the operator need not concern him or herself with overfilling the measuring vessel because with the above described method, the manually operated pump prevents such overfilling.

Even though the above described method of the present invention is simple, it is highly accurate. It has been found that the desired volume that can be drawn into and then dispensed from the vessel can be controlled to within +/− one ounce within the range of 5 ounces to 95 ounces. Furthermore, the present invention is capable of drawing and then dispensing small volumes of liquid, in the range of 5 ounces.

Thus, the above described method of the present invention can replace more costly and complicated procedures currently in use.

In yet another form, the present invention provides a hand powered apparatus for drawing a desired measurement volume of chemical stored in a bulk tank and dispensing the measured volume for mixing with a diluent. The apparatus comprises a measuring vessel which holds and measures the chemical. The vessel has an interior, a fluid inlet allowing fluid communication from the bulk tank to the interior, and a fluid outlet allowing fluid communication from the interior to a dispensing device. A manually operated pump which alternately provides positive and suction air pressure is provided. The positive and suction air pressure are produced by alternating pressure and vacuum strokes respectively. An air passage connects the pump to the interior of the vessel and a selectively engageable valve is disposed along the air passage. The valve is located intermediate the pump and the interior and includes a vacuum port and a pressure port. The valve is selectively engageable with either the vacuum or the pressure ports. When the vacuum port is engaged by the valve, the vacuum strokes communicate the suction pressure to the interior which in turn causes liquid to be drawn into the interior through the fluid inlet. Similarly, when the pressure port is engaged by the valve, the pressure strokes communicate the positive pressure to the interior which causes liquid to be dispensed from the interior through the fluid outlet.

One advantage of the apparatus of the present invention is its low cost. The present invention uses basic parts and principles of operation and an economy thereof. The apparatus of the present invention is therefore an economical tool to measure and dispense a precise volume of liquid.

Another advantage of the present invention is that it does not need electricity to operate. Unlike prior art dispensing apparatuses which can be rendered inoperable by a failure of a power supply or unavailability thereof, the present invention needs no such power supply. Instead, the present invention can be easily operated by simply activating a hand pump.

Another advantage of the present invention is that, unlike prior art apparatuses which require an air vent to vent the vacuum pressure accumulated during the filling operation, the present invention requires no such air vent. Thus, an additional port, an air passage, and a source for potential failure has been eliminated by the apparatus of the present invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
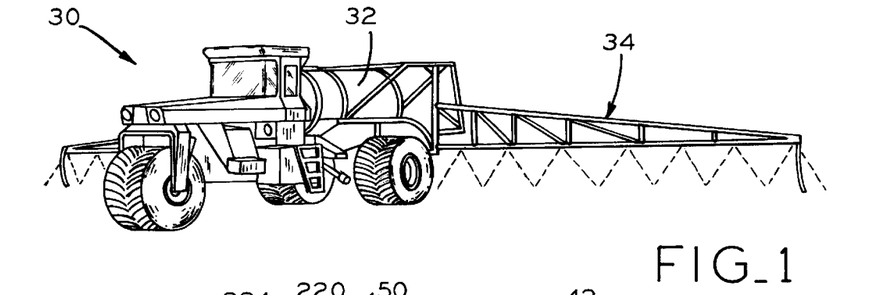
FIG. 1 is an elevational view of a tractor applying an agrichemical onto a field via a boom sprayer, the agrichemical being stored in a tank on the tractor.

FIG. 1 shows a tractor 30 such as, for example, a typical commercially available all-purpose farm tractor on which is installed a tank 32 of a certain volume carried at the rear thereof. Tractor 30 is equipped with a boom-type sprayer 34 such as commonly used for applying various liquid agrichemicals onto crops or fields. Sprayer 34 is fluidly connected to tank 32 which holds the agrichemical for application.

Presently, most of the various types of agrichemical that are used by the agricultural community, such as herbicides, pesticides, fungicides, and the like, are packaged for purchase in a concentrated form. This reduces the volume of liquid which must be transported to the field for application versus the traditional non-concentrated form. Also, because of the concentrated form, the tank containing the agrichemical may be smaller.

Figure 2:
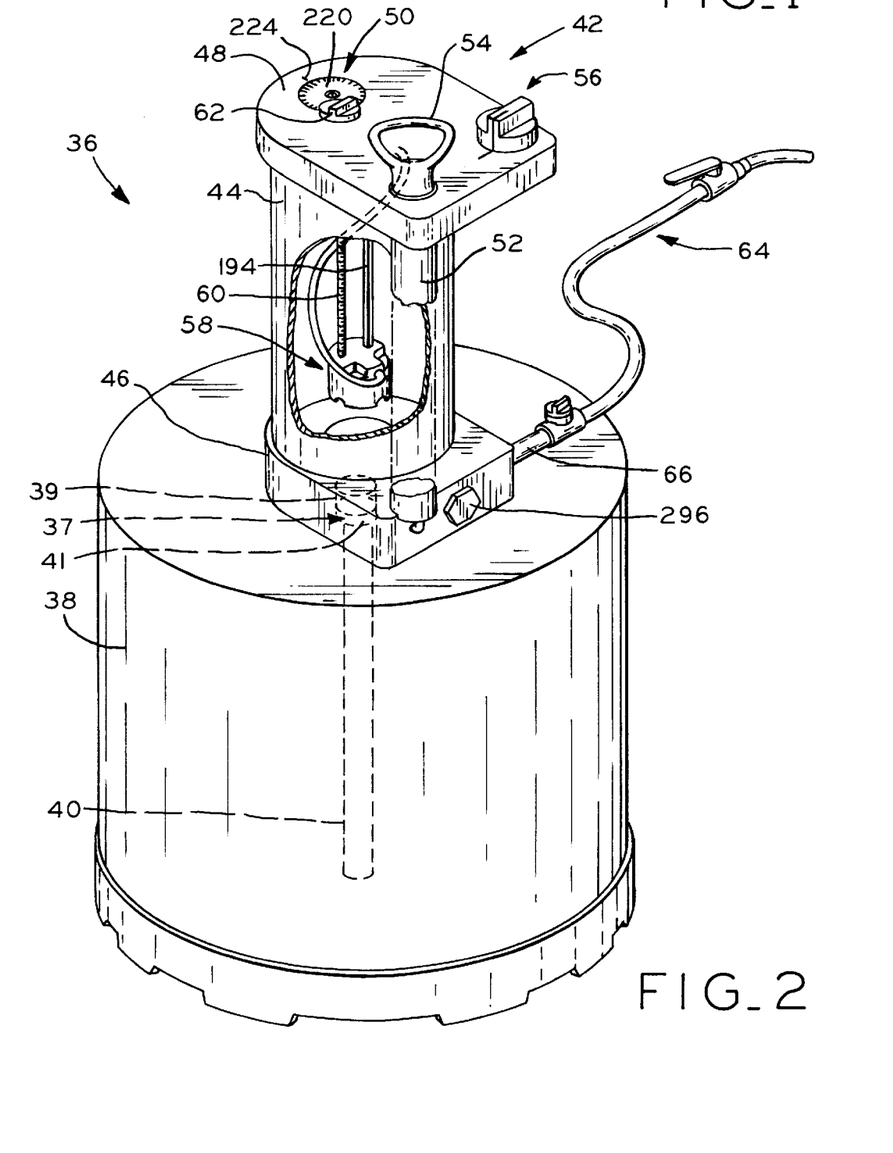
FIG. 2 is a perspective view partially broken away of a chemical measuring and dispensing system according to an embodiment of the present invention.

Referring now to FIG. 2 there is depicted an embodiment of the present chemical measuring and distribution apparatus 36. A bulk storage tank 38 contains the concentrated agrichemical of which a quantity needs to be measured and then diluted with a suitable volume of diluent prior to field application. The typical bulk storage tank 38 is generally fabricated from a suitable plastic material such that the tank may be returned for refilling or recycling.

Bulk storage tank 38 includes opening 37 in which is installed a coupling 41 extending upwardly therefrom. A fitting 39 extending downward from apparatus 36 mates with coupling 41. Fitting 39 and coupling 41 can be correspondingly threaded so that sealing engagement between the two is obtained. Further, fitting 39 threadably engages base 46 of apparatus 36. The arrangement of fitting 39 and coupling 41 can be seen with reference to FIG. 12, discussed below. Returning to FIG. 2, conduit 40 is provided extending from the inner bottom of tank 38 to opening 37 in the top, having a check valve therein and terminating with coupling 41. Conduit 40 thus provides fluid communication between the interior of tank 38 and apparatus 36 for drawing the agrichemical out of the tank.

In accordance with one aspect of the present invention, apparatus 36 includes measuring vessel assembly 42 having cylindrical main body 44 which is attached to base 46 at its bottom end and top plate 48 at its top end. Main body 44, base 46 and top plate 48 are fabricated out of a plastic such as, for example, polypropylene. Top plate 48 includes a liquid volume control 50 whose adjustment allows a preset volume of liquid to be drawn into and thereafter dispensed from measuring vessel 42. Pump 52 is threadably installed in top plate 48 and includes pump handle 54, the movement of which causes fluid to be drawn into and dispensed from vessel 42. Valve assembly 56 is also disposed within top plate 48, the adjustment of which selectively allows either a suction pressure or a positive pressure to be delivered from pump 52 into main body 44. As noted, top plate 48 is suitably formed from polypropylene and in the embodiment described herein has a thickness of approximately 2 inches.

With further reference to FIG. 2, float assembly 58 is threadingly attached to lead screw 60 which in turn is attached to volume control dial 62 of volume control 50. As discussed in more detail below, selective rotation of dial 62 controls the relative vertical displacement of float assembly 58 within main body 44. Float assembly 58 is activated when fluid entering main body 44 reaches the level at which float assembly 58 is vertically positioned. Thus, float assembly 58 acts as a switch which in turn prevents further suction pressure from being communicated into the interior of main body 44. A dispensing assembly 64 is attached to the fluid outlet 66 of vessel 42 so that the measured volume of liquid agrichemical can be dispensed therefrom.

Turning now to FIG. 3, the basic principle by which apparatus 36 operates can be understood. Pump 52 is hermetically connected to measuring vessel 42 through air passage 68, which air passage is hermetically connected to pump 52 through pump outlet 70 at one end, and is hermetically connected to the interior of measuring vessel 42 at the other end. As shown in FIG. 3, pump 52 is comprised of pump handle 54 having attached thereto a piston 72 which moves upwardly and downwardly in cylinder 74. When pump handle 54 is moved upwardly, piston 72 also moves upwardly therewith and causes air to be drawn into lower chamber 79 from air passage 68. Similarly, when pump handle 54 is pushed downwardly, cylinder 74 correspondingly moves downwardly and pushes air from within chamber 79 outwardly through air passage 68. Gaskets, or "lip seals," 73 and 75 are installed on the top and bottom of piston 72, as shown so that air passage from lower chamber 79 to upper chamber 81 is prevented. Upper chamber 81 is vented to ambient (not shown) so that movement of pump handle 54 is not hindered by pressure changes therein. An off-the-shelf pump such as part number 3-7522 manufactured by R. E. Chapin modified to prevent any leakage past gaskets 73 and 75 during the vacuum stroke has been found to work suitably with the present invention. The modification consists of adding a second lip seal turned in the opposite direction to prevent air leakage during the vacuum stroke.

Valve assembly 56 is shown disposed along and connected to air passage 68 and is selectable as shown between a fill and a dispense position. When valve assembly 56 is positioned in the fill position as shown in FIG. 3, only suction pressure can be communicated from pump 52 to measuring vessel 42, which therefore allows a vacuum to be built up within measuring vessel 42 and in turn causes liquid agrichemical to be introduced into measuring vessel 42. More specifically, the pump handle 54 is moved upwardly and downwardly by an operator with the valve assembly 56 positioned in the fill position and valve assembly 56 thereby permits vacuum pressure to be communicated into measuring vessel 42 on the upward, or "vacuum" strokes of handle 54. Valve assembly 56 vents positive pressure produced on the alternating downward, or "pressure" strokes of handle 54 to the ambient atmosphere.

As the pumping operation of downward pressure strokes and upward vacuum strokes of handle 54 continues, liquid agrichemical is introduced through check valve assembly 76 through inlet conduit 49 and into vessel 42. Check valve assembly 76 is a one way valve which allows fluid to flow only in the direction shown by arrow 77 in FIG. 3. That is, liquid being drawn into vessel 42 forcibly opens check valve 76, whereas, once entry of fluid in vessel 42 is complete, the head pressure created by the liquid contained within measuring vessel 42 closes check valve assembly 76 so that the liquid is retained within the vessel. As pumping of handle 54 continues, the fluid level 78 of vessel 42 continues to rise until the fluid level 78 reaches the level of switch 58, which in the embodiment discussed herein is comprised of a float assembly. However, other suitable switch devices for switch 58 which are known in the art may be employed in lieu of a float assembly. When fluid level 78 reaches switch 58, switch 58 activates whereupon vacuum pressure can no longer be communicated to the interior of vessel 42 from pump 52 through air passage 68. In fact, once switch 58 is activated, further movement of handle 54 in the vacuum stroke direction (upwardly) is prevented because the only supply of air into lower chamber 79 of pump 52 has been effectively cut off. Thus, switch 58 acts as a shut-off valve preventing further passage of air through air passage 68.

Advantageously, the pumping of pump handle 54 incrementally produces vacuum pressure within measuring vessel 42 so that the vacuum pressure within vessel 42 is always only slightly more than that needed to raise the fluid level 78 within measuring vessel 42. Significantly, it has been found that the suction pressure within vessel 42 at the time switch 58 is activated is only slightly greater than that needed to attain a fluid level 78 at the level of switch 58. Therefore, after switch 58 is activated, further upward movement of liquid level 78 in vessel 42 is negligible. Unlike prior art apparatuses, then, venting of measuring vessel 42 upon the liquid level 78 reaching the desired volume in an attempt to quickly equalize pressure is unnecessary. Indeed, the disclosed embodiment of the present invention does not even provide a vent for such purposes.

Once the desired level of fluid 78 in vessel 42 has been reached and movement of handle 54 in the vacuum stroke direction is no longer possible, valve assembly 56 is switched to the dispense position as shown in FIG. 3. Thereupon, continued movement of handle 54 in the vacuum stroke and pressure stroke directions is again possible. As handle 54 is moved upwardly and downwardly, the downward pressure stroke of handle 54 causes air within chamber 79 to be pushed outward through pump outlet 70 through air passage 68 through valve assembly 56 and into measuring vessel 42. Operating oppositely as in the fill position, valve 56 in the dispense position allows positive pressure produced by pressure strokes of handle 54 to be communicated into measuring vessel 42, whereas valve 56 allows suction pressure created by the vacuum strokes of handle 54 to be drawn from the ambient.

Fluid outlet conduit 66 of measuring vessel 42 includes check valve assembly 80. In addition to preventing fluid passage in the direction opposite arrow 83 shown in FIG. 3, check valve assembly 80 also requires a minimum pressure greater than the head pressure created by a totally filled measuring vessel 42 in order to unseat check valve assembly 80. This way, when the fill operation is complete, fluid cannot leave measuring vessel 42 through outlet 66 because the head pressure of liquid level 78, even at the top of measuring vessel 42, is not enough to unseat check valve assembly 80. Additional pressure provided by pump 52 is necessary to unseat check valve assembly 80 and allow fluid to exit vessel 42.

Thus, upon switching valve 56 to the dispense mode, upward and downward movement of handle 54 produce a pressure within measuring vessel 42 greater than the head pressure exerted by the liquid whereupon check valve assembly 80 unseats and the measured volume of liquid within measure vessel 42 is dispensed through outlet 66.

Figure 5:
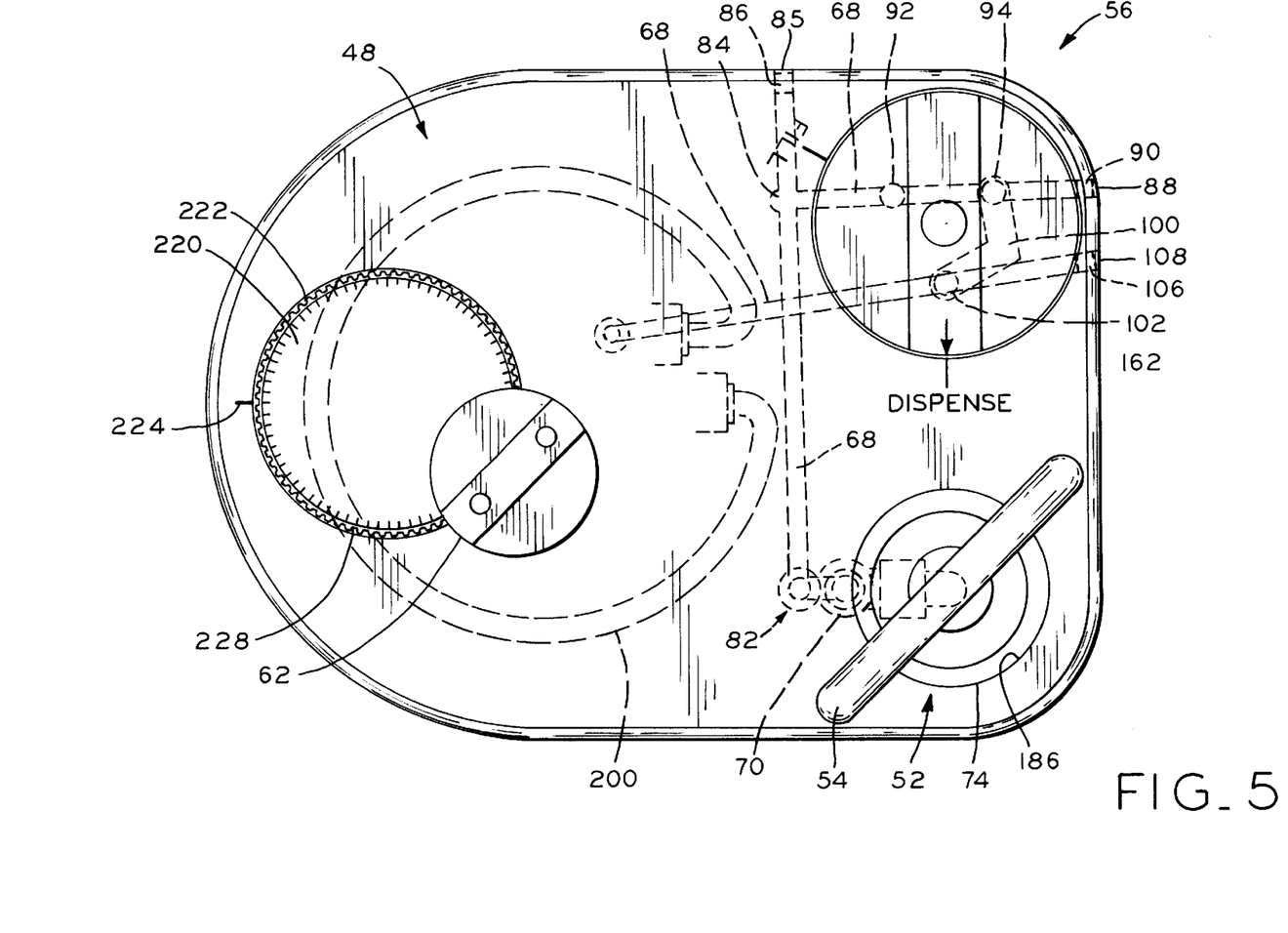
FIG. 5 is a top plan view of the top plate of the present invention.

The mechanism by which suction and positive pressure are transferred into vessel 42 can be better understood by examining an air passage of a working embodiment. Air passage 68 is shown generally in FIGS. 4 and 5. With reference to FIG. 5, air passage 68 begins at pump outlet 70 and continues upwardly through top plate 48, as shown in FIG. 4, and bends at substantially 90° at bend 82. The portion of air passage 68 extending from the bottom of top plate 48 to bend 82 can be constructed by drilling a hole through top plate 48 the diameter of which corresponds to the diameter of air passage 68, which in this embodiment has a diameter of 3/16 inch. Air passage 68 continues from bend 82 through top plate 48 to second bend 84. The portion of air passage 68 extending from bend 82 to bend 84 can be formed by drilling an annular bore through the side top plate 48 extending to bend 82, and then threadably forming end 85 thereof. Threaded plug 86 can then be inserted into the end 85 thereby sealing end 85. At bend 84, air passage 68 bends roughly 90° and continues to threaded end 88, as shown in FIGS. 4 and 5. The portion of air passage 68 extending from bend 84 to end 88 can be formed by drilling an annular bore into the side of top plate 48 and then threadably forming end 88 thereof and sealing end 88 with plug 90. Shown connected to air passage 68 between bend 84 and end 80 are vacuum port 92 and pressure port 94 having vacuum check valve 96 and pressure check valve 98 disposed therein respectively, the operation of which is described hereinbelow.

Valve assembly 56 includes channel passage 100 shown in FIG. 5. Selective engagement of channel passage 100, as discussed below, allows alternative connection of air passage 68 between vacuum port 92 and tank port 102 or pressure port 94 and tank port 102. Thus, it can be understood that the air passage is connected from the portion of air passage 68 between end 88 and bend 84 by channel member 100 to tank port 102. The portion of air passage 68 extending from tank port 102 to bend 104 as shown in FIG. 4 can be formed by drilling an annular bore through top plate 48 and then inserting a plug 106 into end 108 as shown in FIGS. 4 and 5. Finally, air passage 68 completes its path through top plate 48 by extending downwardly through vertical portion 107 and connecting to a flexible tube 200 (shown in FIG. 12), as further explained hereinbelow.

Thus, it can be appreciated that air passage 68 extends from pump outlet 70 through top plate 48 by way of valve assembly 56 and thereafter into the interior of measuring vessel 42.

Figure 6:
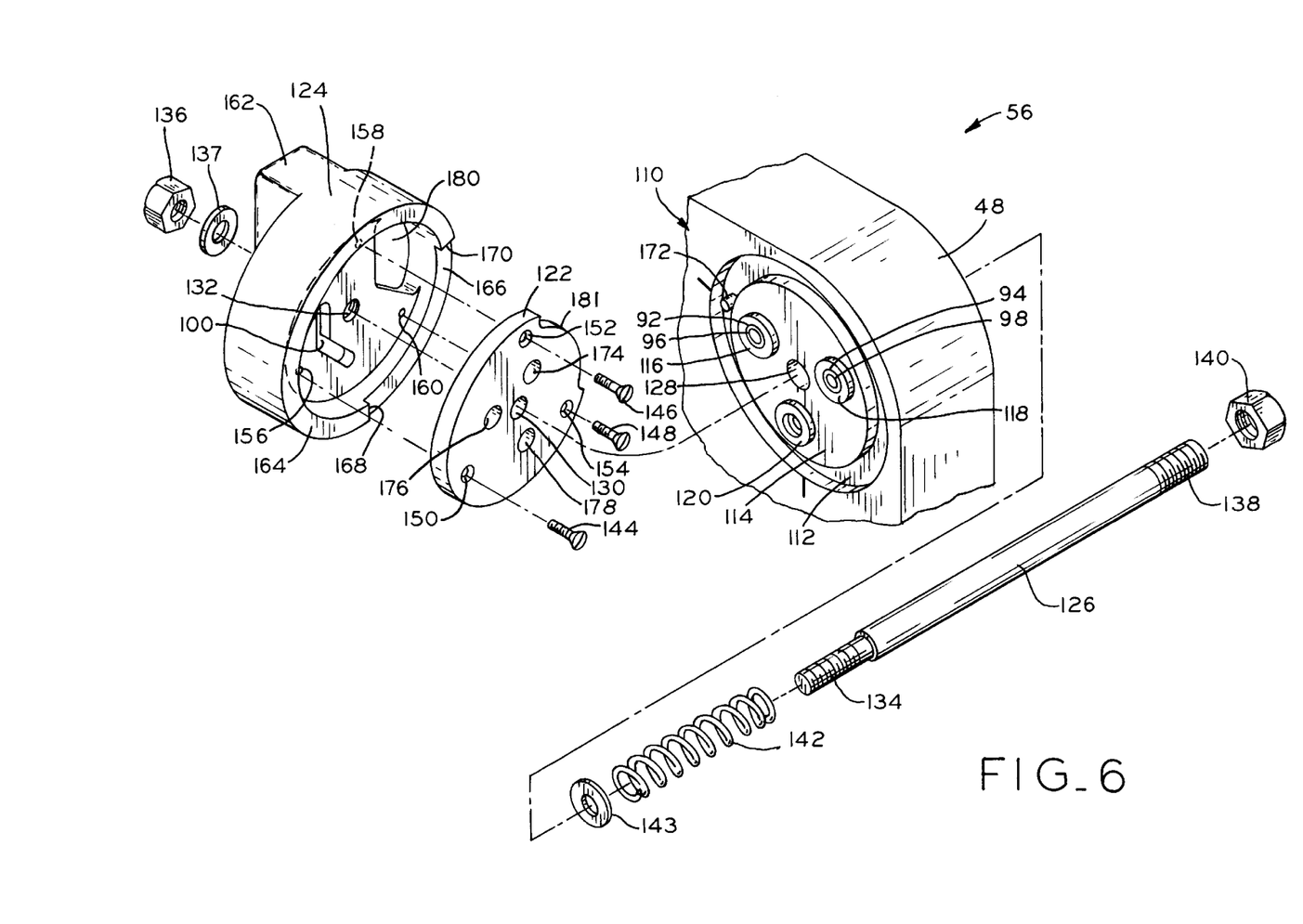
FIG. 6 is an exploded perspective view of the valve assembly of the present invention.
Figure 7:
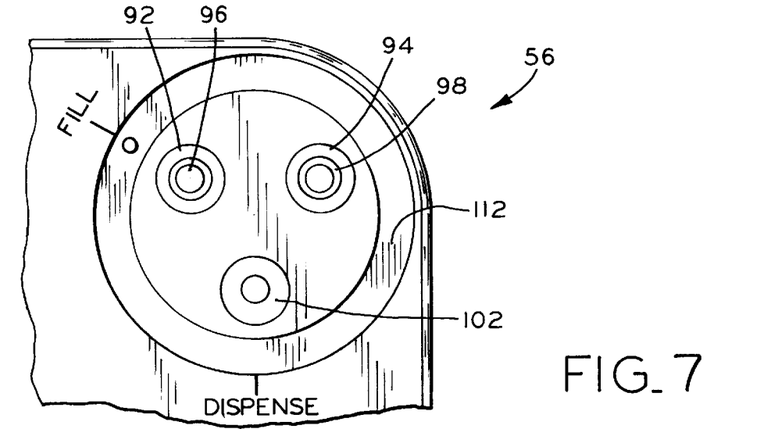
FIG. 7 is a top plan view of the valve body of the present invention integrally formed within the top plate.

The operation of valve assembly 56 will be further appreciated with reference to FIGS. 6–11 as now discussed. As shown in FIG. 6, valve body 110 is integrally formed in top plate 48 and comprises annular recess 112 which circumscribes circular disk 114. The valve body 110 is formed as part of the molding process of top plate 48. As shown in FIG. 6, circular disk 114 protrudes outwardly from annular recess 112 and the top surface of circular disk 114 includes three protruding valve seats 116, 118, 120 which house vacuum port 92, pressure port 94 and tank port 102, respectively. Valve plate 122 shown exploded away in FIG. 6 is positioned between valve body 110 and valve manifold 124 and provides sealing engagement therebetween.

In assembled form, valve stem 126 extends through bore 128 in valve body 110, through bore 130 in valve plate 122 and bore 132 in valve manifold 124. The threaded end 134 of valve stem 126 threadably engages nut 136 and washer 137 whereas the other threaded end 138 engages nut 140, spring 142 and washer 143. In one selected configuration of valve assembly 56, spring 142 biases valve handle 124 and in turn valve plate 122 against valve seats 116, 118 and 120, thereby providing sealing engagement between valve plate 122 and valve seats 116, 118 and 120. Valve plate 122 is secured to valve manifold 124 by screws 144, 146 and 148 which slidably insert through screw holes 150, 152 and 154 and then are threadably received into threaded apertures 156, 158 and 160, respectively. Thus, valve plate 122 is nonrotatably secured to valve manifold 124.

Valve manifold 124 is rotatably disposed on valve stem 126 so that valve manifold 124 can rotate with respect to valve body 110 by moving valve handle 162. Annular manifold ring 164 is received into annular recess 112 and includes recessed portion 166. Abutment ends 168 and 170 are formed on each end of recessed portion 166 and when valve manifold 124 is seated within valve body 110 the abutment ends 168 and 170 prevent rotation of valve manifold 124 by means of engagement with stop pin 172 extending from annular recess 112. Manifold ring 164 does not contact recess 112. Instead, engagement is obtained between valve plate 122 and the ports on disk 114.

It being understood that valve manifold 124 is selectively rotatable about valve body 110 by movement of valve handle 162, the configuration selected in FIG. 6, includes bore 174 seated against vacuum port 92 extending from circular disk 114. Similarly, bore 176 seats against pressure port 94 whereas bore 178 seats against tank port 102. Vent area 180 in manifold 124 corresponds to cut-away portion 181 on valve plate 122 so that ambient air can communicate through vent area 180 and through bore 174. With further reference to FIG. 6 and best illustrated in FIG. 8, pressure port 94 connects with tank port 102 through bores 176 and 178, which in turn are connected by channel passage 100. That is to say that the arrangement of valve handle 162, as shown in FIGS. 6 and 8, allows passage of air from pressure port 94 to tank port 102 through channel passage 100 and therefore serves as a connection for communication of positive pressure from pump 52 through air passage 68 into the interior of vessel 42.

Figure 8:
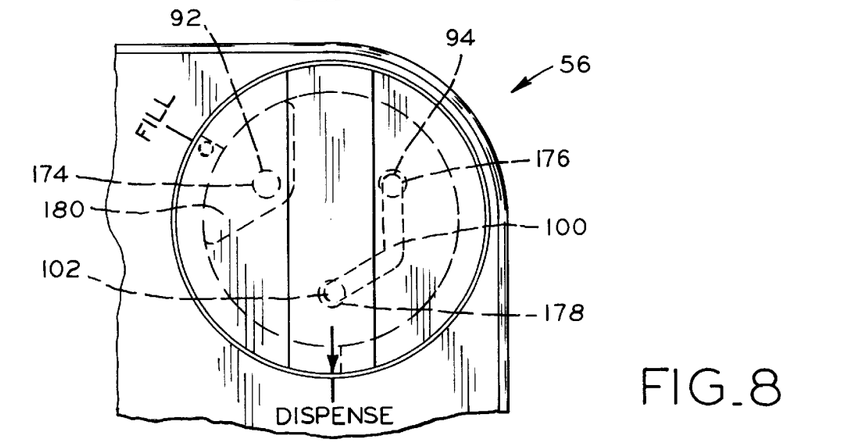
FIG. 8 is a top plan view of the valve assembly of the present invention in the dispense position.
Figure 10:
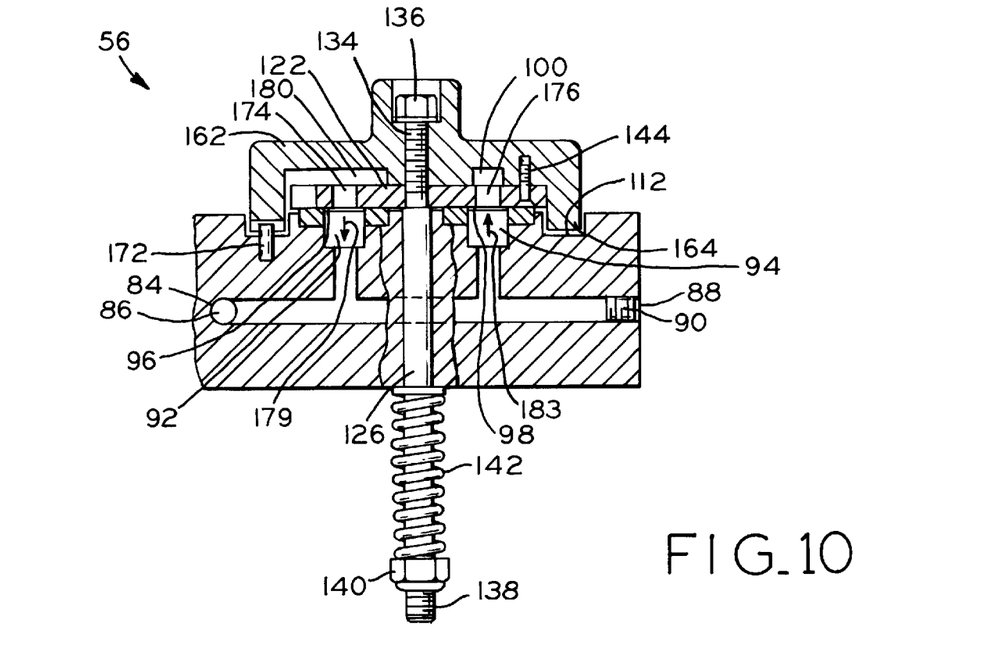
FIG. 10 is a side sectional view of the valve assembly positioned as in FIGS. 6 and 8.

Such communication of positive pressure from the pressure stroke of pump handle 54 through valve assembly 56 in the arrangement shown in FIGS. 6 and 8 can be further understood with reference to FIG. 10. During the downward pressure stroke of pump handle 54, the direction of air flow in air passage 68 is from pump 52 toward the interior of vessel 42 and consequently, the direction of air flow is from bend 84 toward end 88 as seen in FIG. 10. As air flows from bend 84 to end 88, the air first encounters vacuum port 92 having check valve 96 disposed therein. Check valve 96 is disposed within vacuum port 92 in such a way that air can only move in the direction shown by arrow 179. That is, in the arrangement shown in FIG. 10, air can only flow in the direction from vent area 180 through bore 174 and into air passage 68 through vacuum port 92. Because such a direction is opposite the direction of air flow created by the pressure strokes, the flow of air from bend 84 to end 108 during the downward pressure stroke of the pump is prevented from escaping from vacuum port 92 by check valve 96.

Pressure port 94 also includes a check valve 98 disposed therein. However, check valve 98 allows air flow in a direction opposite than does check valve 96 as shown by arrow 183. Thus, during the pressure stroke of pump 52, air moving from bend 84 toward end 88 can flow through pressure port 94, bore 176 and then into channel passage 100. Referring back to FIG. 8 in particular, the positive pressure can then be communicated through channel passage 100 to tank port 102 and in turn into the interior of vessel 142 through air passage 68. During the pressure stroke, then, air flows from bend 84, and is directed into pressure port 94, bypassing vacuum port 92.

Of course, in using a pump such as pump 52, each pressure stroke is alternated with a vacuum stroke. During the vacuum stroke, the direction of air flow is from the ambient into valve assembly 56, through air passage 68 and then back into pump 52. More specifically, the vacuum stroke causes ambient air to enter vent area 180, pass through one way check valve 96 through vacuum port 92 and in turn back toward bend 84, which ultimately leads to pump 52. While the direction of air flow during the vacuum stroke is from end 88 to bend 84 as shown in FIG. 10, one way check valve 98 disposed in pressure port 94 prevents air from passing therethrough. Thus, during the vacuum stroke in the valve arrangement shown in FIG. 10, there is no communication of suction pressure from valve assembly 56 to the interior of vessel 42 because check valve 98 prevents such communication.

Figure 9:
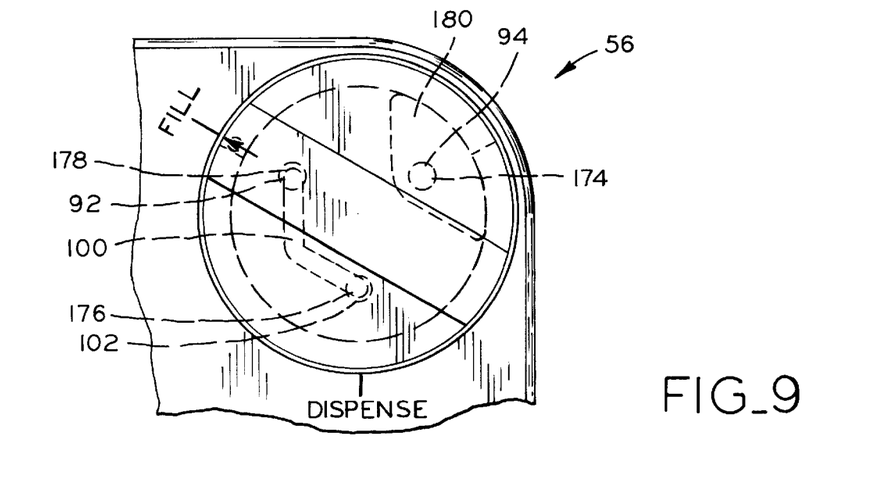
FIG. 9 is a top plan view of the valve assembly of the present invention in the fill position.
Figure 11:
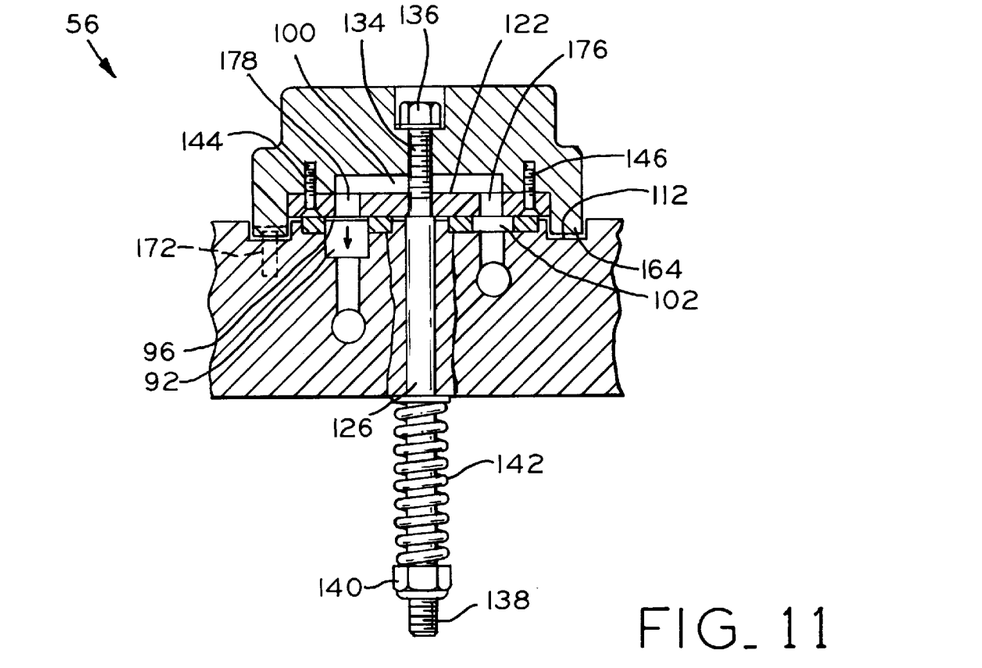
FIG. 11 is a side sectional view of the valve assembly positioned as in FIG. 9.

Valve assembly 56 has a selectable "fill" position as shown in FIGS. 9 and 11. When valve handle 162 is positioned in the arrangement shown in FIGS. 9 and 11, pressure port 94 communicates with the ambient atmosphere through vent area 180 as shown in FIG. 9, just like vacuum port 92 communicates with the ambient through vent area 180 when valve handle 162 is positioned in the arrangement shown in FIGS. 8 and 10. Vacuum port 92 communicates with tank port 102 through channel passage 100 as shown in FIGS. 9 and 11. Thus, during the vacuum stroke of pump handle 54, the direction of air flow is from vessel 42 through tank port 102, channel passage 100 and then through vacuum port 92. Air continues to flow through air passage 68 and finally back into pump 52. The suction pressure transmitted to vessel 42 from air passage 68 is made possible by one-way check valve 96 disposed in vacuum port 92. One-way check valve 96 allows air flow in the direction just described, but not vice versa. On the other hand, pressure port 94 with vent area 180 disposed thereabove does not allow ambient air to be sucked therethrough during the vacuum stroke because check valve 98 prevents such air passage. It can thus be understood that during the vacuum stroke with the valve handle arranged in the fill position as shown FIGS. 9 and 11, vacuum pressure is able to be applied to the interior of vessel 42 by air suction through air passage 68, valve assembly 56 and into pump 52. Similarly, during the pressure stroke of pump handle 54 with the valve handle 62 arranged in the fill position, positive pressure is prevented from being communicated into the interior vessel 42 by check valve 96. Instead, the positive pressure is vented to the ambient through pressure port 94 through one way check valve 98.

It can thus be understood that by selectively positioning valve handle 162, suction pressure, or alternatively, positive pressure can be applied to the interior of vessel 42 by the pumping of pump handle 54.

Figure 12:
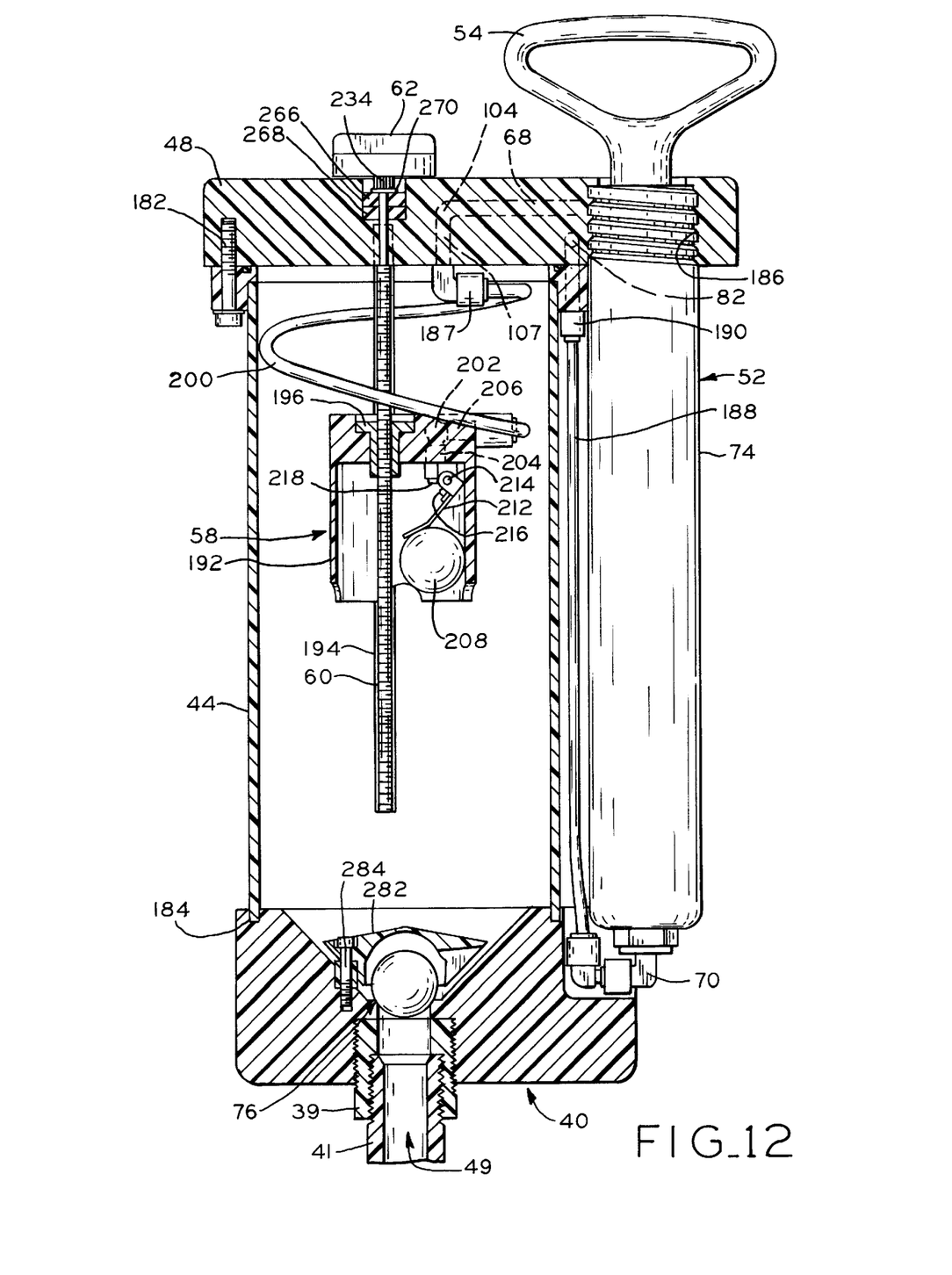
FIG. 12 is a side elevational view in partial cross section of an apparatus of the present invention.
Figure 13:
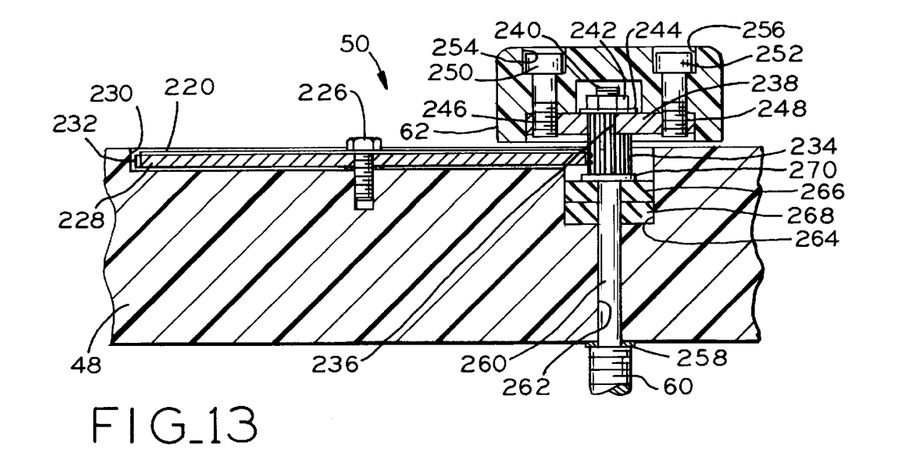
FIG. 13 is an enlarged side sectional view of the volume control of the present invention.
Figure 14:
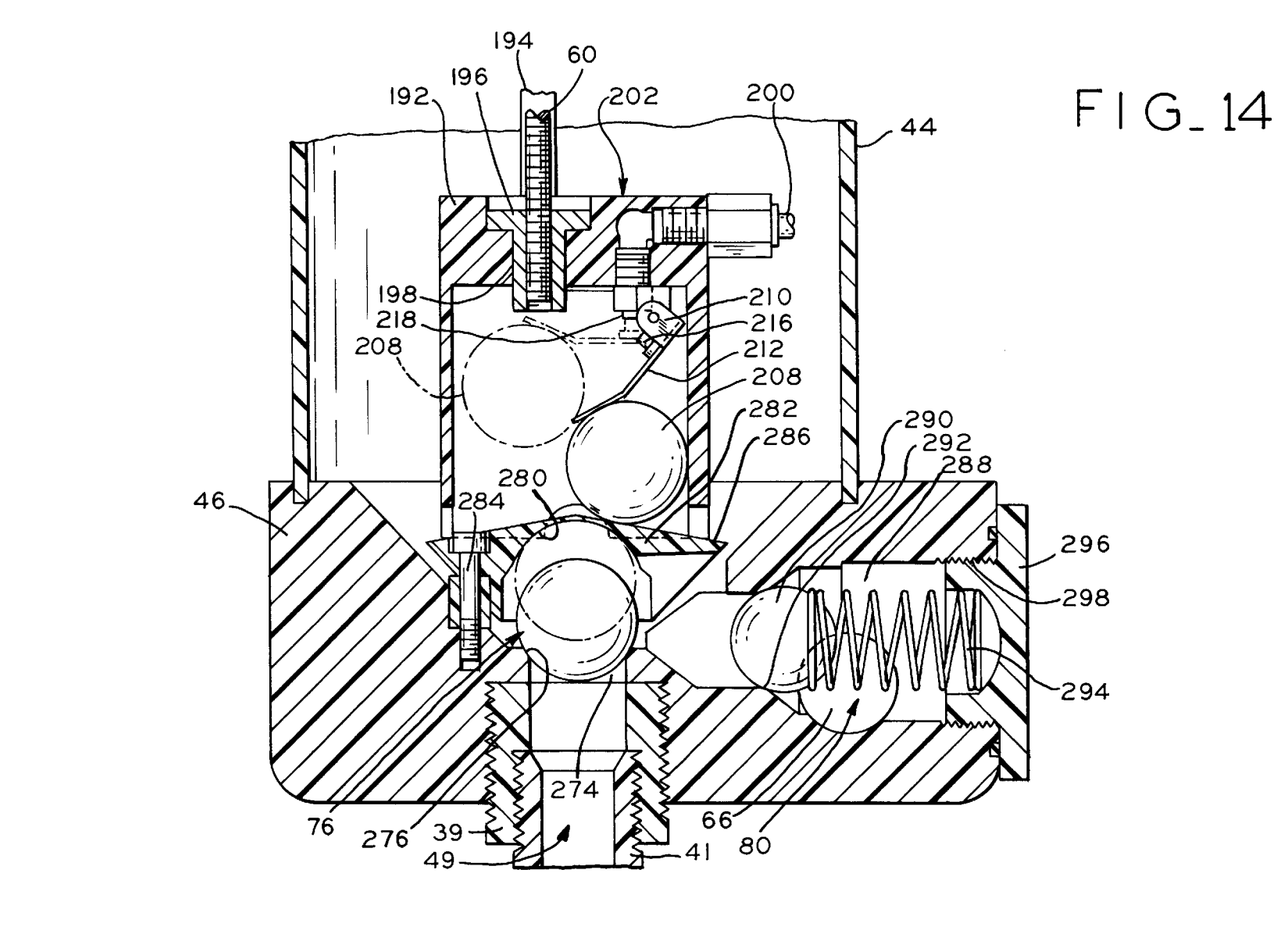
FIG. 14 is an enlarged side elevational view in partial cross section of the float assembly and inlet and outlet of a vessel of the present invention.

Having described the supplying of suction and positive pressure to the interior of vessel 42, the inner workings of main body 44 can be understood with reference to FIGS. 12–14, as well as with reference to FIGS. 4 and 5. Referring now to FIG. 12, main body 44 is secured to top plate 48 by a plurality of top plate screws 182, only one of which is shown in FIG. 12. The bottom end of main body 44 inserts into annular groove 184 and is secured by one of many methods known in the art such as heat welding, epoxy gluing and the like. As also shown in FIG. 12, pump 52 includes a threaded top end which screws into threaded bore 186 for securing pump 52 to top plate 48. The bottom end of pump 52 includes pump outlet 70 which is connected to pump hose 188, which through connector 190 connects pump 52 to air passage 68. Air passage 68 continues through valve assembly 56 as described hereinabove, and is then directed down through top plate 48 through end 107.

As shown in FIG. 12, main body 44 includes switch 58 which comprises a float housing 192 suspended therein by lead screw 60. A fixed support bar 194 also extends from top plate 48 into float housing 192 and guides float housing 192 as it traverses upward and downward within main body 44. Support bar 194 can also be seen in FIG. 2. As discussed in more detail below, the relative vertical placement of float housing 192 within main body 44 determines the amount of agrichemical or liquid which can enter vessel 42 during filling. The vertical placement of float housing 192 within main body 44 can be adjusted by rotating dial 62 which in turn rotates lead screw 60 relative to threaded lead screw nut 196 as shown generally in FIG. 12. As discussed above, when the suction pressure supplied to the interior of vessel 42 is terminated, fluid entry into the vessel is stopped. As shown in FIG. 12, end 107 connects to flexible tube 200 through connector 187 so that air passage 68 supplies suction pressure through flexible tube 200 and into the interior of main body 44 through passageway 202 having couplings 204 and 206 connected thereto.

Referring now to FIG. 14, threaded lead screw nut 196 is nonrotatably secured within bore 198, whereby turning of lead screw nut 60 causes upward or downward movement of float housing 192 relative to main body 44. Float housing 192 includes ball float 208 pivotably connected to the semi-circular flat plate 210 through arm 212 and fastened by pivot pin 214. Plug 216 is attached to arm 212 and when the fluid level in vessel 42 causes ball float 208 to rise as shown in phantom lines in FIG. 14, plug 216 sealingly engages opening 218 thereby preventing further suction pressure from being applied to the interior of vessel 42. Thus, by adjusting float housing 192 to a predetermined vertical position within main body 44, the volume of liquid drawn into vessel 42 can be controlled precisely.

Advantageously, float assembly 58 comprising float housing 192 is located substantially along the longitudinal axis of main body 44, so that if vessel 42 is not oriented quite level when being filled, the fluid level obtained therein will still be accurate. This is so because by placing float assembly 58 in the longitudinal center of main body 44, variations in fluid level relative to float assembly 58 will be symmetric, and thus tend to correct one another. For example, a higher fluid elevation on one side of float assembly 58 will be compensated for by a correspondingly lower fluid level in a diametrically opposite position. Therefore, slight variations in the level of vessel 42 will not adversely effect the measurement of fluid volume.

The selection of the exact volume of fluid that can enter vessel 42 is accomplished by rotating dial 62 as best shown in FIG. 5. With further reference to FIG. 5, rotation of dial 62 causes rotation of indicator plate 220. Indicator plate 220 has demarcations 222 printed thereon so that rotation of dial 62 in turn causes rotation of indicator plate 220 and movement of demarcations 222 relative to indicator arrow 224. Each demarcation 222 is calibrated to a known vertical displacement of float housing 192 within vessel 42, which in turn is calibrated to an exact known volume of liquid. Thus, by aligning the appropriate demarcation with indicator arrow 224, the exact amount of liquid to be drawn into vessel 42 can be preset.

With reference to FIG. 13, the mechanism by which dial 62 and indicator plate 220 work together can be appreciated. As shown in FIG. 13, indicator plate 220 and gear 228 are attached to top plate 48 by screw 226 and are rotatable relative thereto. Cover plate 220 covers gear 228 which is disposed within circular recess 230. As gear 228 rotates about indicator gear screw 226, the demarcations 222 on indicator plate 220 move relative to indicating arrow 224. Indicator gear 228 has teeth 232 located around its outer perimeter which teeth mesh with the teeth of screw gear 234 as shown in FIG. 13. Lead screw gear 234 is non-rotatably disposed relative to lead screw 60 and dial 62 so that rotation of dial 62 causes lead screw gear 234 to rotatably engage gear 228, which rotates indicator plate 220. While such rotation is taking place, the threaded lead screw vertically displaces float housing 192. As shown in FIG. 13, lead screw 234 has a top side which is semi-circularly shaped and fits into gear aperture 236 in drive plate 238. The topmost portion of lead screw 234 is threaded end 240 which secures gear 234 in drive plate 238 by means of hex nut 242 and washer 244.

Drive plate 238 includes threaded apertures 246 and 248 which rotatably receive cap screws 250 and 252, respectively. As the machine-threaded ends of cap screws 250 and 252 are turned into threaded apertures 246 and 248, the heads of the cap screws eventually engage the cap screw recesses 254 and 256, thereby providing a secure fit of dial 62 with respect to drive plate 238. As seen in FIG. 13, lead screw 60 has flange portion 258 which abuts against the bottom surface of top plate 48. Lead screw 60 also includes a smooth cylindrical portion 260 which is correspondingly received in cylindrical bore 262 disposed in top plate 48. A cylindrical recess 264 having a large diameter is located in top plate 48 and includes seals 266 and 268 disposed therein which prevent fluid communication through top plate 48. A smooth washer 270 is positioned between gear 234 and seal 270 to prevent wear therebetween.

Turning now to FIG. 14, the inlet and outlet of liquid into and from vessel 42 can be appreciated. Fluid inlet 49 includes threaded fitting 39 therein, comprising a threaded cylindrical bore into which coupling 41 is threadably inserted. Inlet 49 has an opening 274 located in its top center for fluid communication therethrough. Check valve assembly 76 includes valve seat 276 which sealingly engages ball valve 278, thereby preventing fluid from exiting the vessel 42 through opening 274. On the other hand, as fluid enters the vessel through opening 274, the fluid pushes ball valve 278 upward to the position shown in phantom in FIG. 14. During such fluid entry into vessel 42, ball valve 278 is biased to a seated position within round recess 280 located centrally at the bottom of deflector plate 282. In turn, deflector plate 282 is secured to base 46 by three deflector plate screws 284, one of which is shown in FIG. 14. The top surface 286 of deflector plate 282 serves to deflect fluid as it exits vessel 242, preventing such exiting fluid from unseating ball valve 278 from valve seat 276.

With regard to the exiting of fluid from vessel 42, fluid outlet 66 is connected to cavity 288 which houses check valve assembly 80. Outlet 66 is sealed by engagement of spring-loaded ball valve 290 against valve seat 292. The tension in check spring 294 is adapted to be only slightly greater than a corresponding head pressure created by the liquid in a filled vessel 42. In this manner, a pressure only slightly greater than the fluid head pressure is required to unseat ball valve 290 from valve seat 292 and thereby allow exit of liquid from vessel 42. The check spring 294 is held into place and installed by hex nut 296 which threadably installs into bore 298 disposed in base 46. Conveniently, if the ball valve 290 somehow became jammed within cavity 288, hex nut 296 could be removed and ball valve 290 could be readjusted.

The operation of apparatus 36 during the filling of vessel 42 with liquid and then dispensing therefrom is now described. The measuring vessel 42 is first hooked up to tank 38, shown in FIG. 1, by threadably inserting coupling 41 to conduit 40 and fitting 39. With reference to FIGS. 12 and 5, dial 62 is manually rotated, which in turn moves demarcations 222 relative to indicator arrow 224. Correspondingly, float assembly 192 is positioned to a select vertical location within main body 44 as shown in FIG. 12, which in turn determines the exact amount of liquid which can enter vessel 42.

Upon adjusting dial 62 and indicator plate 220 to the desired setting, valve handle 162 of valve assembly 56 is rotated to the fill position as shown in FIG. 5. Thereupon, handle 54 can be moved alternately upwardly and downwardly by an operator thereby causing vacuum pressure to be transferred from pump 52 through air passage 68 and into the interior of vessel 42 through opening 218 in float housing 192. That is to say, while the pump handle is being moved upwardly and downwardly alternately with the valve handle 162 in the fill position, the vacuum strokes cause suction pressure to be transferred to the interior of vessel 42 which thereby causes a vacuum in vessel 42. Conversely, the pressure strokes are vented to ambient.

Referring now to FIG. 14, because the pumping of handle 54 has created a lower pressure in the inside of vessel 42 relative to the liquid pressure in tank 38, a nonequilibrium condition exists. Because such a system will tend to return to equilibrium, in so doing fluid enters vessel 42 from tank 38 through opening 274 thereby unseating ball valve 278. As the pumping continues, the suction pressure within vessel 42 continues to increase whereby a larger head of fluid is drawn into vessel 42. This process of pumping and thereby causing fluid to enter vessel 42 is continued until the fluid level within vessel 42 floats ball float 208 so that plug 216 is seated within opening 218. Thereupon, further pumping of the pump in the vacuum stroke is prevented because the air passage 68 from pump 52 to the interior of vessel 42 is shut.

With reference to FIG. 14, float housing 192 could optionally be provided with a vent hole at the top portion thereof (not shown), thereby equalizing the pressure within housing 192 and the area surrounding housing 192 during filling of vessel 42. By venting housing 192, the liquid level both within housing 192 and surrounding the exterior surface of housing 192 remains substantially the same after the liquid level in vessel 42 climbs beyond the bottom of housing 192. This is so because suction pressure would be vented through the vent hole (not shown) upon the liquid level reaching the bottom of housing 192.

Advantageously, however, it has been found that the present invention is capable of accurately drawing relatively small volumes into vessel 42 and dispensing them therefrom. Small volume measuring and dispensing capabilities are achieved by not providing a vent hole in housing 192. As shown in FIG. 14, smaller volumes of liquid can be drawn into and dispensed from vessel 42 by positioning float housing 192 near the bottom of measuring vessel 42. Housing 192 shown in FIG. 14 contains no vent opening so that once the rising liquid level reaches the bottom of housing 192, the interior of housing 192 is effectively sealed. Upon this "sealing," the suction provided by the vacuum strokes cannot be communicated beyond the inside of housing 192. Thus, suction pressure continues to be applied to the interior of housing 192, but not the exterior. This results in fluid being drawn inside float housing 192 but not into the area of vessel 42 surrounding housing 192. That is, as fluid is drawn into vessel 42, the liquid level inside of housing 192 continues to rise until the rising liquid level causes ball float 208 to seat plug 216 within opening 218. By contrast, the liquid level surrounding the exterior surface of housing 192 stops rising at the bottom most part of housing 192. The volumetric capacity of the interior of float housing 192 is of course much smaller than that of the entire vessel 42 so that small volumes are able to be drawn into and dispensed from an apparatus employing the present invention.

Having filled vessel 42 to the desired level, the valve handle 162 can be moved to the dispense position as shown in FIG. 5 whereupon pumping of the pump handle 54 upward and downwardly can be resumed. As discussed above, with the valve handle 162 in the dispense position, positive pressure from pump 52 is communicated through air passage 68 into vessel 42 whereas suction pressure generated by the vacuum stroke of the pump is sucked from the ambient. Referring to FIG. 14, the positive pressure within vessel 42, in addition to the head pressure of liquid in vessel 42, causes ball valve 290 to unseat from valve seat 292, whereupon liquid is dispensed from vessel 42 through fluid outlet 66. Pumping is continued until the entire amount of liquid is dispensed from vessel 42 because as the fluid level in vessel 42 decreases, so too does the head pressure exerted by the fluid on ball valve 290. Thus, in order to maintain sufficient pressure against ball valve 290 during dispensing, increased air pressure provided by pumping action of pump 52 is required.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of measuring a desired volume of liquid agrichemical from a chemical storage tank and dispensing the measured volume therefrom for mixing with a diluent, the method comprising the steps of:

provid­ing a measuring vessel of known volume, the measuring vessel having a fluid inlet in fluid communication with the storage tank and a fluid outlet;

operating a manually operated pump to communicate suction pressure from a pump outlet through an air passage to an interior of the measuring vessel to cause a desired volume of less than or equal to the predetermined volume of the measuring vessel of the chemical within the storage tank to be drawn therefrom and into the measuring vessel via the inlet; and then operating the pump to communicate positive pressure from the pump outlet through the air passage to the interior of the measuring vessel to dispense the measured volume of chemical from the measuring vessel via the outlet.

2. The method of claim 1, wherein the manually operated pump comprises a hand pump having a handle, and the handle is moved so as to produce the suction and positive pressure alternately.

3. A method of using a hand pump to draw a desired amount of liquid into a vessel and then dispensing the liquid therefrom, said method comprising the following steps:

connecting a fluid inlet conduit to a supply of liquid chemical, the inlet conduit also connected to the vessel which has a fluid outlet conduit connected thereto;

connecting an outlet of a hand pump to the vessel movement of the handle of the hand pump providing alternating positive pressure and suction through the outlet;

operating the hand pump through repeated strokes to draw a vacuum on the vessel to thereby draw liquid from the supply through the inlet conduit and into the vessel;

then operating said hand pump through repeated strokes to pressurize the vessel, thereby causing the liquid therein to be forced out through the outlet conduit.

4. The method of claim 3 comprising the additional step of presetting a desired volume of liquid to be drawn into the vessel and automatically stopping the flow of liquid into the vessel by preventing vacuum pressure to be communicated to the vessel when said desired volume of liquid has been drawn into the vessel.

5. The method of claim 4 wherein the step of automatically stopping the flow of liquid is accomplished by presetting the vertical position of a float activated shut-off valve in said vessel, the shut-off valve in fluid communication with said hand pump.

6. A method of measuring a desired volume of liquid chemical from a chemical storage tank and dispensing the measured volume therefrom for mixing with a diluent, the method comprising the steps of:

(a) providing a measuring vessel of known volume, the measuring vessel having a fluid inlet in fluid communication with the storage tank and a fluid outlet;

(b) setting a control to select a variable desired volume of liquid to be dispensed;

(c) operating a manually operated pump to communicate suction pressure from a pump outlet through an air passage to an interior of the measuring vessel to cause the desired volume of the chemical within the storage tank to be drawn therefrom and into the measuring vessel via the inlet; and (d) then operating the hand pump to communicate positive pressure from the pump outlet through the air passage to the interior of the measuring vessel to dispense the desired volume of chemical from the measuring vessel via the outlet.

7. The method of claim 6, further comprising the steps of:

moving a valve provided on the vessel to a fill position before step (c); and then moving the valve provided on the vessel from the fill position to a dispense position before step (d).

8. The method of claim 6, wherein step (c) proceeds to step (d) without venting the vessel to ambient.

9. A hand powered apparatus for drawing a desired measurement volume of liquid chemical stored in a bulk tank and dispensing the measured volume for mixing with a diluent, said apparatus comprising:

a measuring vessel which holds and measures the chemical, said measuring vessel having an interior, a fluid inlet allowing fluid communication from the bulk tank to said vessel interior, and a fluid outlet allowing fluid communication from said vessel interior to a dispensing device;

a manually operated pump which alternately provides positive pressure and suction air pressure, said positive pressure and suction air pressure being provided by alternating positive pressure and suction strokes, respectively;

an air passage connecting said pump to said vessel interior;

a valve disposed along said air passage, said valve located intermediate said pump and said vessel interior, said valve further including a vacuum port and a pressure port, said valve selectively engagable with one of said vacuum and said pressure ports, and wherein:

when said vacuum port is engaged by said valve, said suction strokes communicate said suction pressure to said interior which causes liquid chemical to be drawn into said interior through said fluid inlet; and when said pressure port is engaged by said valve, said positive pressure strokes communicate said positive pressure to said interior which causes liquid chemical to be dispensed from said interior through said fluid outlet.

10. The apparatus of claim 9, further comprising:

a shut-off switch for automatically stopping a flow of the liquid chemical drawn into said measuring vessel when the liquid chemical is at one of a plurality of selected predetermined levels within said measuring vessel, wherein said shut-off switch comprises a float assembly.

11. The apparatus of claim 10, wherein said float assembly is generally disposed coaxial with a longitudinal axis of said measuring vessel.

12. The apparatus of claim 10, wherein said shut-off switch is in fluid communication with said pump, whereby said shut-off switch prevents said vacuum stroke upon the chemical reaching one of said plurality of selected predetermined levels.

13. The apparatus of claim 10, wherein said float assembly includes an opening therein, and a flexible tube connected to and in fluid communication with each of said air passage and said float assembly opening, said float assembly positioned at a selected location within said measuring vessel, said float assembly including a float which is movable in a vertical direction and closes said float assembly opening when contacted by said liquid chemical.

14. The apparatus of claim 9, further comprising:

a first check valve installed in said vacuum port which allows air flow in a first direction, wherein when said vacuum port is engaged, said first check valve allows said suction pressure to be communicated to said interior during said vacuum stroke, whereas said first check valve prevents communication of said positive pressure to said interior during said pressure stroke, and wherein when said pressure port is engaged, said first check valve allows air to be drawn from the ambient during said vacuum stroke, whereas said first check valve prevents communication of said positive pressure with the ambient during said pressure stroke; and a second check valve installed in said pressure port which allows air flow in a second direction, wherein during said engagement of said pressure port said second check valve allows said positive pressure to be communicated to said interior during said pressure stroke, whereas said second check valve prevents communication of said suction pressure to said interior during said vacuum stroke, and wherein during said engagement of said vacuum port, said second check valve allows said positive pressure to be vented to the ambient during said pressure stroke, whereas said second check valve prevents air from being drawn from the ambient during said vacuum stroke.

15. The apparatus of claim 14, wherein said first and second directions are substantially opposite.

16. The apparatus of claim 9, wherein said selectively engageable valve further comprises:

a tank port connecting to said interior of said vessel;

a channel connector having a first and second end, said channel connector adapted for communicating said suction pressure and said positive pressure to said tank port; wherein when said vacuum port is engaged, one of said first and said second ends connects to said vacuum port whereas the other of said first and second ends connects to said tank port, whereby said suction pressure travels from said pump through said vacuum port, through said channel connector, through said tank port and into said interior, and wherein when said pressure port is engaged, one of said first and said second ends connects to said pressure port whereas the other of said first and second ends connects to said tank port, whereby said positive pressure travels from said pump through said pressure port, through said channel connector, through said tank port and into said interior.

17. The apparatus of claim 9, wherein said pump comprises a hand pump further comprising a piston disposed within a cylinder and connected to a handle, said piston sealingly engaging said cylinder during movement in either vertical direction, whereby movement of said handle alternately comprises said suction and said positive pressure strokes.

18. An apparatus for pumping a desired volume of liquid from a bulk tank, said apparatus comprising:

a cylinder having a piston disposed therein, a handle attached to said piston, alternate movement of said handle causing air to be alternately drawn into and expelled from said cylinder, air being drawn into said cylinder comprising a suction stroke and air being expelled from said cylinder comprising a pressure stroke;

a measuring vessel for holding the desired volume of liquid, said measuring vessel having a fluid inlet and a fluid outlet, said inlet adapted to allow one-way fluid flow therethrough into said vessel from the bulk tank and said fluid outlet adapted to allow one-way fluid flow therethrough from said vessel;

an air passage connecting said cylinder to an interior of said vessel;

a valve operatively connected between said cylinder and said vessel, said valve selectively engageable in a fill position and a dispense position, said fill position allowing said suction stroke to be communicated through said air passage to said vessel interior and said pressure stroke to be communicated through said air passage to ambient, said dispense position allowing said pressure stroke to be communicated through said air passage to said interior and said suction stroke to be communicated through said air passage to the ambient, whereby when said fill position is selected, said alternate movement causes the liquid to enter said vessel and when said dispense position is selected said alternate movement causes liquid to exit said vessel.

19. The apparatus of claim 18, further comprising an air shut-off switch connected to said air passage, engagement of said switch preventing fluid flow into said vessel.

20. The apparatus of claim 19, wherein said switch can be adjusted to a plurality of pre-set fluid volumes.

21. The apparatus of claim 20, wherein said switch comprises a float valve which is vertically adjustable within said vessel, whereby the desired volume of liquid entering said vessel closes said float valve, thereby preventing said vacuum strokes from drawing a vacuum in said vessel.

22. The apparatus of claim 21, wherein a closed float valve is openable by selective engagement of said fill position and said alternate movement, whereby the desired volume of liquid exits said vessel.

23. The apparatus of claim 18, further comprising:

a housing disposed at a predetermined level within said vessel, said housing having a volumetric capacity much smaller than said vessel;

said air passage connecting internally of said housing;

said housing including an opening disposed at a bottom end thereof which allows the liquid to enter said housing, said opening disposed at a location corresponding to said predetermined level.

24. The apparatus of claim 23, wherein:

said housing is adapted to form a substantially airtight seal when the liquid entering said vessel reaches said predetermined level and the vacuum from said suction stroke is thereby prevented from being communicated externally of said housing, whereby the liquid continues to rise within said housing whereas the liquid surrounding said housing stops rising at said bottom end.

25. The apparatus of claim 23, wherein:

a vent hole is disposed in said housing; and when the liquid entering said vessel reaches said predetermined level said suction stroke is vented through said vent hole, whereby the liquid continues to rise substantially equally within said housing and surrounding said housing.

* * * * *